United States Patent [19]

Sagata et al.

[11] Patent Number: 5,129,869
[45] Date of Patent: Jul. 14, 1992

[54] RING CONE TYPE STEPLESS TRANSMISSION

[75] Inventors: Makoto Sagata; Kiyoshi Nabetani; Tokudo Saita, all of Osaka, Japan

[73] Assignee: Kubota Corporation, Osaka, Japan

[21] Appl. No.: 539,912

[22] Filed: Jun. 18, 1990

[30] Foreign Application Priority Data

| Jun. 23, 1989 | [JP] | Japan | 1-161400 |
| Jun. 27, 1989 | [JP] | Japan | 1-164339 |
| Jun. 27, 1989 | [JP] | Japan | 1-164340 |
| Jun. 27, 1989 | [JP] | Japan | 1-164341 |
| Jun. 27, 1989 | [JP] | Japan | 1-164342 |

[51] Int. Cl.$^5$ .................................. F16H 15/50
[52] U.S. Cl. .................................. 475/193; 74/200
[58] Field of Search ............... 475/190, 193, 194, 197; 74/196, 200

[56] References Cited

U.S. PATENT DOCUMENTS

| 4,232,561 | 11/1980 | Kashihara et al. | 475/193 X |
| 4,653,349 | 3/1987 | Kaneyuki | 475/193 X |
| 4,730,515 | 3/1988 | Kaneyuki | 475/193 X |
| 4,751,854 | 6/1988 | Sakai et al. | 74/796 |

FOREIGN PATENT DOCUMENTS

| 60-196458 | 10/1985 | Japan | 475/193 |
| 61-144461 | 7/1986 | Japan | 475/193 |
| 62-270858 | 11/1987 | Japan | |
| 63-140157 | 6/1988 | Japan | 475/193 |
| 2179104 | 2/1987 | United Kingdom | 475/193 |

Primary Examiner—Leslie A. Braun
Assistant Examiner—Ryan W. Massey
Attorney, Agent, or Firm—Webb, Burden, Ziesenheim & Webb

[57] ABSTRACT

A ring cone type stepless transmission for effecting change speed on a torque received from an input section and transmitting the torque to an output section. The transmission comprises a main shaft for rotatably supporting a carrier which rotatably supports a plurality of taper cones. The main shaft further supports a disk-shaped rotatable member spring-loaded for contacting the taper cones to effect torque transmission therewith. A ring-shaped change speed member is provided movable parallel to the main shaft to contact varied positions of the taper cones, thereby varying a transmission ratio between the carrier and rotatable member. A supporting member is also mounted on the main shaft for contacting and supporting the taper cones. This supporting member counteracts a moment acting on the taper cones as a result of contact pressures applied to the taper cones from the rotatable member and change speed member.

11 Claims, 7 Drawing Sheets

RING CONE TYPE STEPLESS TRANSMISSION

TECHNICAL FIELD

The present invention relates to a ring cone type stepless transmission having taper cones.

BACKGROUND OF THE INVENTION

A conventional ring cone type stepless transmission is disclosed in Jananese Patent Publication No. 62-270858, for example. This transmission comprises taper cones, a carrier relatively rotatably supporting shaft, a ring-shaped change connected to an input shaft, a ring-shaped change speed member for contacting the taper cones, and an internal gear for receiving torque from the taper cones. The ratio between the rotating speed transmitted to the carrier and the rotating speed output from the internal gear is steplessly changed by variations in the position of contact between the taper cones and change speed member.

More particularly, the taper cones are oscillatable supported by the carrier through oscillatable axes, to secure a suitable contact pressure between the taper cones and change speed member. The shaft that drives the carrier supports a limiting member in contact with the taper cones to stop oscillations of the taper cones away from the change speed member.

According to this construction, however, when the position of the change speed member is adjusted, an increased difference is produced between the pressure applied by the change speed member to the taper cones and the pressure applied by the limiting member to the taper cones. Consequently, the taper cones may be subjected to a moment whose center is displaced from the respective oscillatable axes. Further, the oscillatable axes must be strong for the above reason and because through these oscillatable axes power is transmitted from the carrier to the taper cones. The transmission line in this known construction tends to be complicated since a gear is required for taking out torque of the taper cones.

SUMMARY OF THE INVENTION

An object of the present invention is to improve the conventional ring cone type stepless transmission noted above, and provide a small and simple construction having excellent durability and operability and yet applicable to many fields.

The above object is fulfilled, according to the present invention by a ring cone type stepless transmission for effecting change speed on a torque received from an input section and transmitting the torque to an output section, comprising a carrier rotatable on an axis, taper cones freely rotatably supported by the carrier, a rotatably member for contacting the taper cones to effect torque transmission therewith, change speed means movable parallel to the axis to contact varied positions of the taper cones, thereby varying a transmission ratio between the carrier and rotatable member, and support means for contacting and supporting the taper cones, the support means being arranged to counteract a moment acting on the taper cones as a result of contact pressures applied to the taper cones from the rotatable member and change speed means.

In order to explain the characteristic functions, of the apparatus according to the present invention, reference is made to FIG. 1 illustrating an embodiment of the invention. As readily understood from FIG. 1, the support means 11 is in a position capable of counteracting the moment resulting from the change speed means 10 and rotatable member 8 contacting the taper cones 7 wherever in a change speed range S the change sped means 10 may be positioned. The balance of moment may be maintained for the taper cones 7 while a change speed operation is effected.

During a change speed operation, the direction in which the support means 11 applies the force to the taper cones 7 will vary to maintain the balance of moment acting on the taper cones 7. When the contact pressure between the rotatable member 8 and taper cones 7 varies with a load variation, the support member 11 applies to the taper cones 7 a pressure corresponding to the varied contact pressure, thereby maintaining the balance of moment.

The balance of moment secured for the taper cones 8 means absence of a force that acts to displace support axes 6 of the taper cones 7 rotatably supported by bearing means 5a included in the carrier 5 (though a force does exist for transmitting torque of the carrier 5 to the support axes 6). This feature allows the bearing means 5a to have a simple, engagement type structure as shown in FIG. 4.

Further, according to this transmission, the rotatable member may be pressed against the taper cones with an increased pressure, which enables frictional power transmission between the taper cones and rotatable member. This feature dispenses with a complicated gear transmission structure.

FIG. 2 shows the way in which moments are applied, with the bearing means 5a providing the center. These moments are balanced and the following equation is established:

$$F1 \times l1 + F3 \times l3 - F2 \times l2 = 0$$

FIG. 3 shows the vectors of this instance.

Thus, the present invention realizes a relatively small ring cone type transmission which has a simple construction compared with the conventional transmission using taper cones, and yet assures a high power transmitting efficiency.

The foregoing and other objects, features and advantages of the invention will be apparent from the following more particular description of preferred embodiments of the inveniton, as illustrated in the accompanying drawings.

DETAILED DESCRIPTION OF THE PREFERRED EMBODIMENTS

First Embodiment

Figure 1:
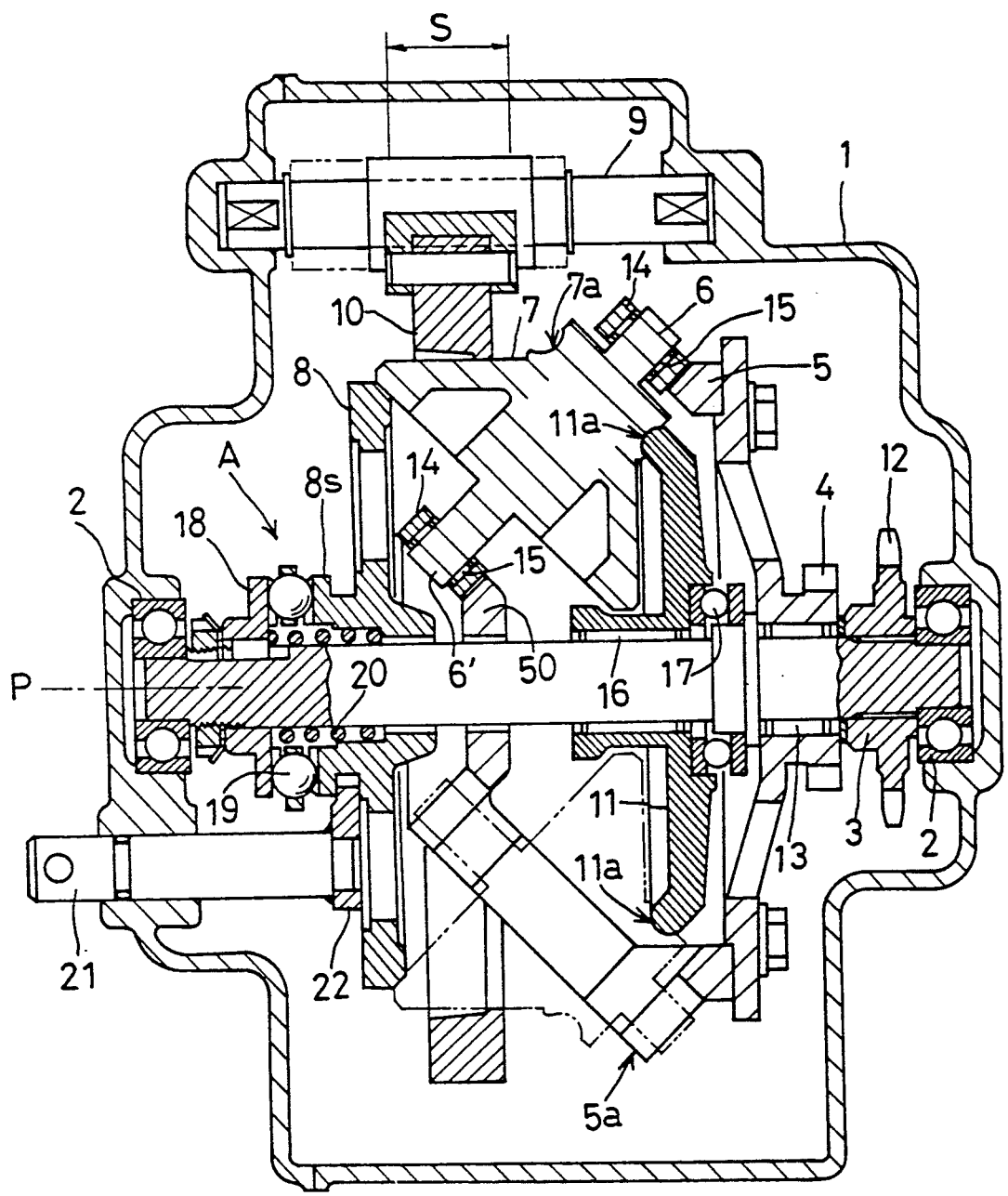
FIG. 1 is a sectional view of a stepless transmission in a first embodiment of the present invention.

As shown in FIG. 1, a frictional stepless transmission comprises a case 1 supporting a main shaft 3 through bearings 2 at opposite ends thereof. The main shaft 3, which is coaxial with an axis P, supports an input gear 4 and a carrier 5 formed integral with each other and mounted for rotation relative to the main shaft 3 and about axis P. The carrier 5 defines retainer grooves 5a each receiving and supporting an axis 6 of each of three taper cones 7 at an apex region thereof through a bearing holder 14 to be described later. A disk-shaped rotatable member 8 is disposed coaxially with the main shaft 3 for contacting large ends or a bottom region of the taper cones 7. An automatic pressure governor A is also disposed coaxially with the main shaft 3 for controlling contact pressure between the rotatable member 8 and taper cones 7. An annular change speed member 10 is mounted on a rod extending parallel to axis P of the main shaft 3. The change speed member 10 is in contact with the taper cones 7 and movable along the rod 9 for positional adjustment. The main shaft 3 carries a support member 11 relatively rotatably mounted thereon and including a projecting edge 11a contacting annular recesses 7a defined adjacent small ends of the taper cones 7. Further, the main shaft 3 carries a sprocket 12 for outputting power from the main shaft 3. The input gear 4, carrier 5, rotatable member 8 and support member 11 are coaxially mounted with one another.

In this embodiment, another axis 6' formed at the large end of each taper cone 7 is supported by a bearing holder 14 as is the foregoing axis 6. This holder 14 is fitted in each retainer groove defined in a bracket 50 relatively rotatably mounted on the main shaft 3.

The transmission includes a needle bearing 13 between the main shaft 3 and the portion of the carrier 5 defining the input gear 4. Further, a needle bearing 15 is provided between each axis 6 or 6' of each taper cone 7 and the holder 14. A needle bearing 16 is provided between the support member 11 and main shaft 3, and a thrust bearing 17 is provided between the support member 11 and carrier 5.

Figure 5:
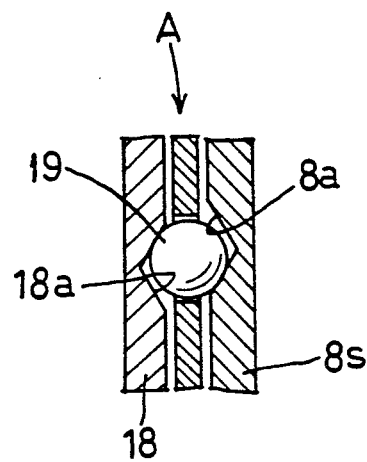
FIG. 5 is a sectional view of an automatic pressure governor.

As shown in FIGS. 1 and 5, the pressure governor A includes a transmission member 18 mounted on the main shaft 3 for sliding adjustment along the axis P and for torque transmission, balls 19 sandwiched between a plurality of wedge-shaped cam surfaces 18a and a plurality of wedge-shaped cam surfaces 8a defined on a sleeve portion 8s of the rotatable member 8 and opposed to the cam surfaces 18a, and a coil spring 20 for initial setting.

The coil spring 20 surrounds the main shaft 3, with one end thereof abutting against a stepped portion of a boss bore defined in the rotatable member 8, and the other end abutting against a side face of the transmission member 18 opposed to the rotatable member 8. With an increased load acting on the pressure governor A, the balls 19 mount the cam surfaces 18a and 8a, thereby hard pressing the rotatable member 8 against the taper cones 7.

Figure 4:
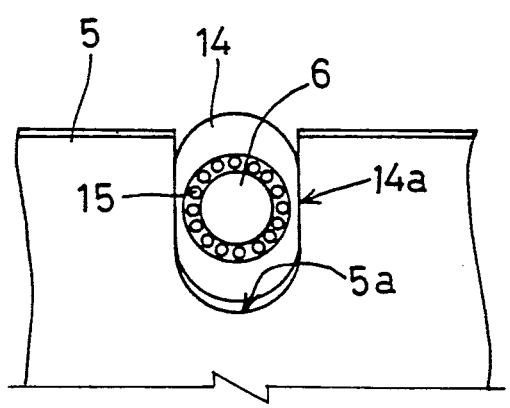
FIG. 4 is a view showing a retainer section for supporting a taper cone.

The sleeve portion 8s of the rotatable member 8 is in engagement with a fork 22 connected to a control shaft 21. Even when power is transmitted, the control shaft 21 may be pulled to move the rotatable member 8 out of contact with the taper cones 7, thereby breaking the power transmission therebetween. As shown in FIG. 4, each of the holders 14 define flat surfaces 14a which provide areas for slidable contact with each retainer groove 5a which has a rectangular shape.

With this transmission, when power is transmitted to the input gear 4 and the change speed member 10 is operated within a change speed range S, the radius of rotation of the taper cones 7 varies at the positions contacting the change speed member 10, that is the circumferential length of the taper cones 7 varies at the positions contacting the change speed member 10. Therefore, when the carrier 5 is rotated a unit amount, a variation occurs in the rotation of the taper cones 7 following the inside wall of the change speed member 10. The rotating speed of the rotatable member 8 driven by the taper cones 7 will thus vary relative to the rotating speed of the carrier 5. As a result, the power is subjected to stepless change speed for output through the sprocket 12 disposed side by side with the input gear 4.

Figure 2:
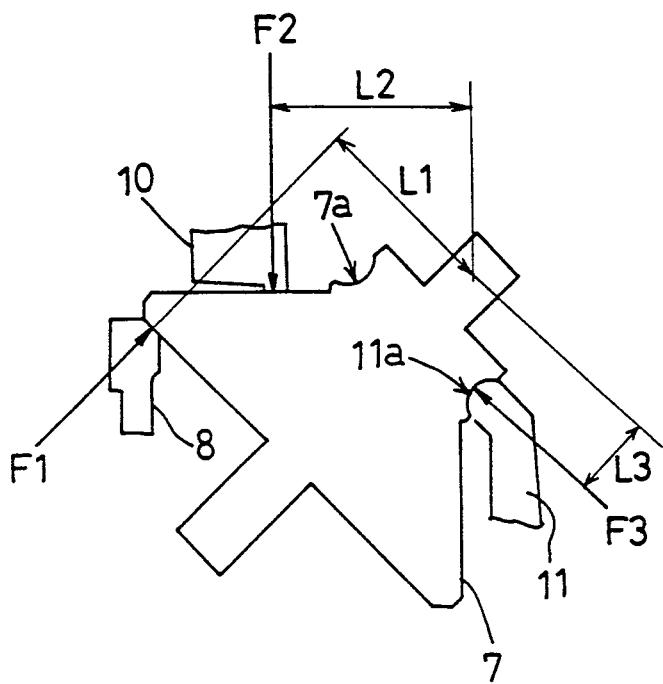
FIG. 2 is an explanatory view showing the way forces are applied to a taper cone.

According to this transmission, where, as shown in FIG. 2, the rotatable member 8 contacts each taper cone 7 with a contact pressure F1, and the change speed member 10 with a contact pressure F2, the support member 11 contacts each taper cone 8 at a position for counteracting a moment acting on the taper cone 8 as a result of the two contact pressures F1 and F2. Thus, if the support member 11 contacts each taper cone 8 with a contact pressure F3, with one of the retainer groove 5a providing the center, a balance of moment is maintained as expressed by the following equation:

$$F1 \times l1 + F3 \times l3 - F2 \times l2 = 0$$

Figure 3:
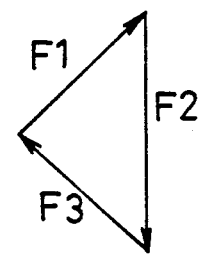
FIG. 3 is an explanatory view of vectors.

The vectors F1, F2 and F3 are closed as shown in FIG. 3.

In this transmission, the projecting edge 11a of the support member 11 is fitted in the annular recesses 7a of the taper cones 7. Therefore, when the change speed member 10 is moved, the posture of taper cones 7 will vary slightly, and the direction in which the projecting edge 11a presses the annular recesses 7a will vary to obtain the balance of moment, thereby reaching a stable condition within a very short time. Further, when the contact pressure between the rotatable member 8 and taper cones 7 varies with a load variation, for example, the support member 11 applies to the taper cones 7 a pressure corresponding to the varied contact pressure, thereby maintaining the balance of moment.

Second Embodiment

Figure 6:
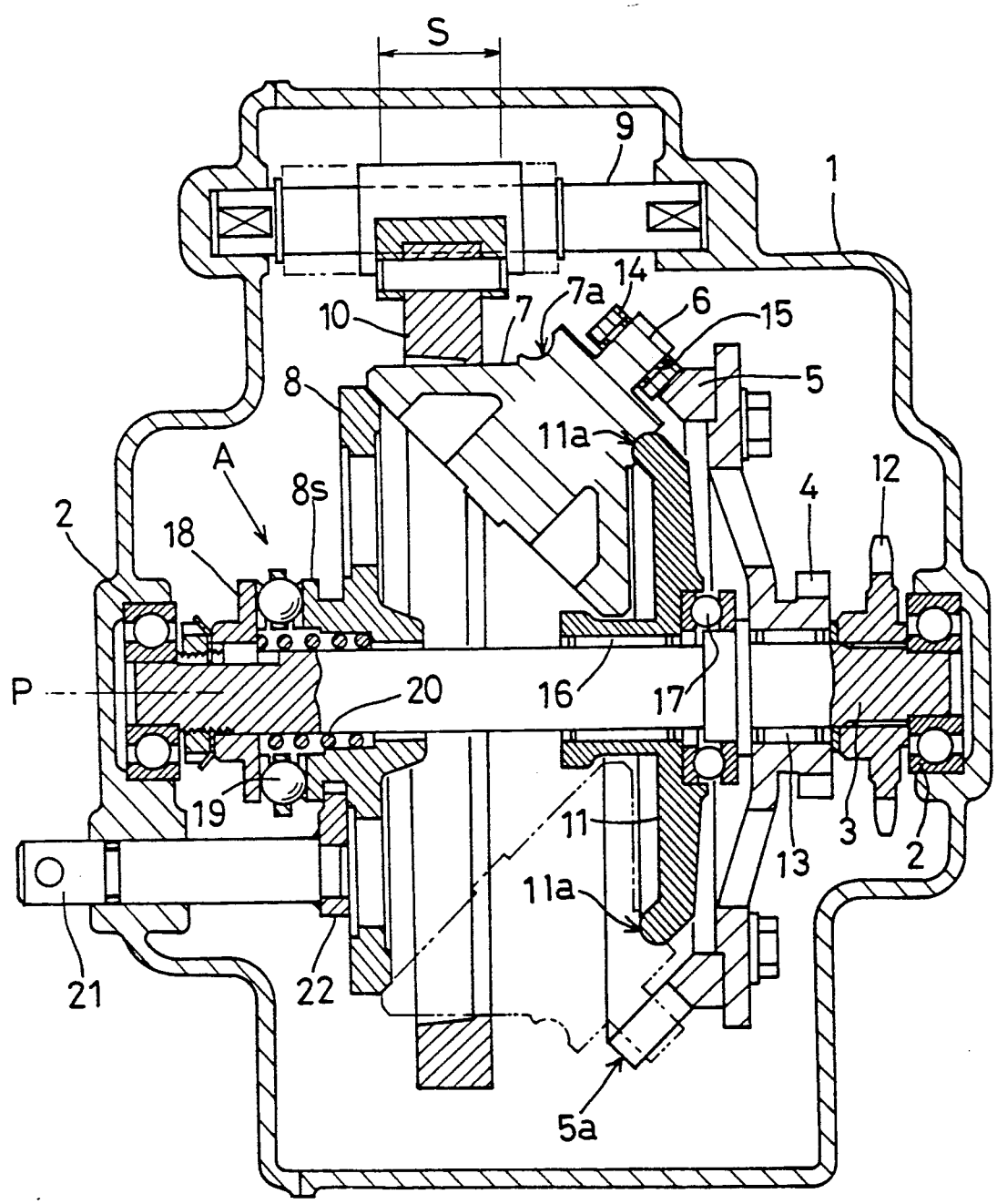
FIG. 6 is a sectional view of a stepless transmisssion in a second embodiment of the present invention.

As shown in FIG. 6, this embodiment differs from the first embodiment in that each taper cone 7 is supported at the axis 6 at the small end only, with the axis 6' omitted from the large end.

The support member 11, as described hereinbefore, effectively balances the forces applied to the taper cones 7, which allows the taper cones 7 to be supported only by the carrier 5, i.e. in a cantilever fashion. Like parts are labeled with like reference numerals with respect to the first embodiment, and such parts will not be described again to avoid repetition. This applies to the other embodiments to follow.

Third Embodiment

Figure 7:
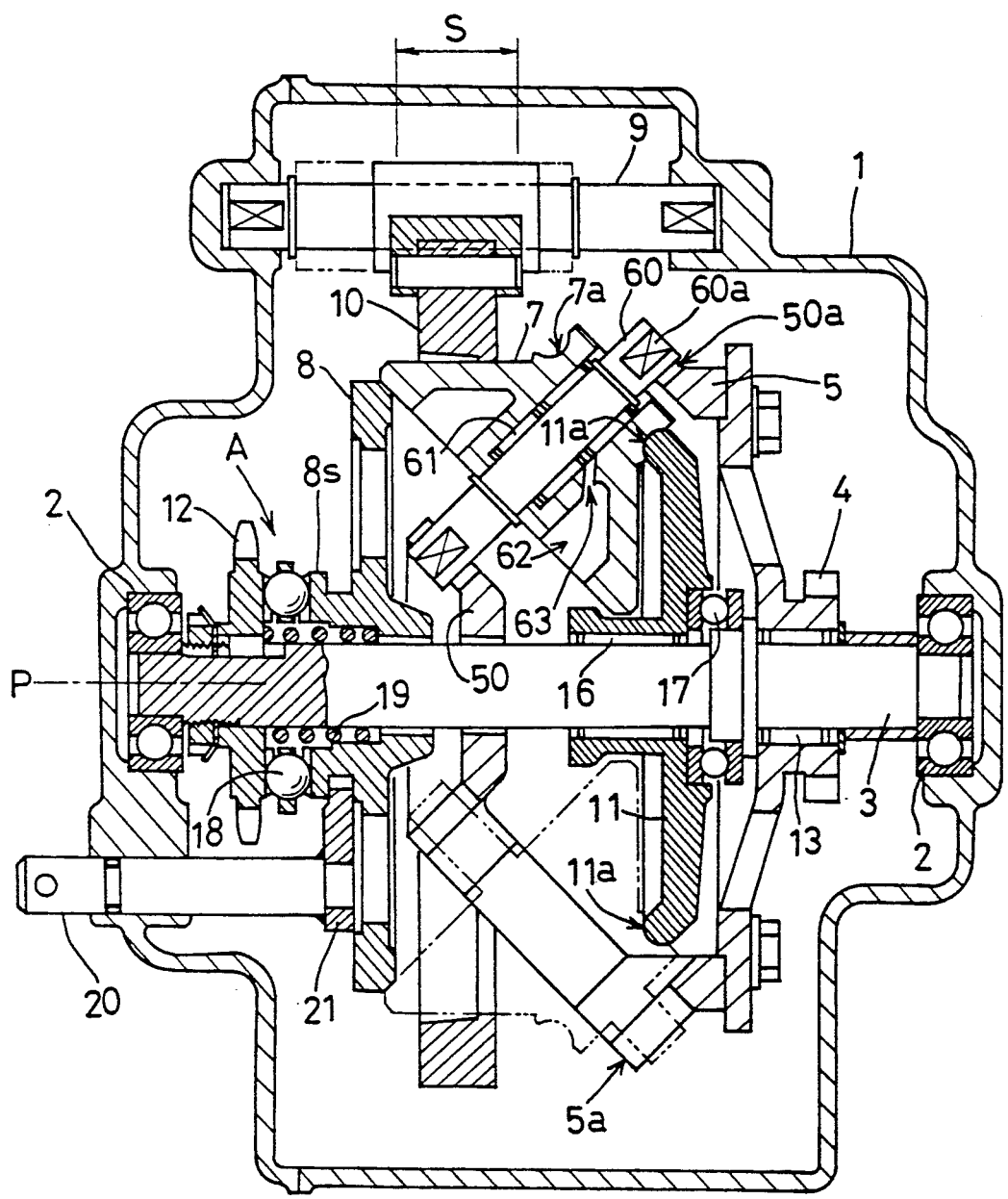
FIG. 7 is a sectional view of a stepless transmission in a third embodiment of the present invention.
Figure 8:
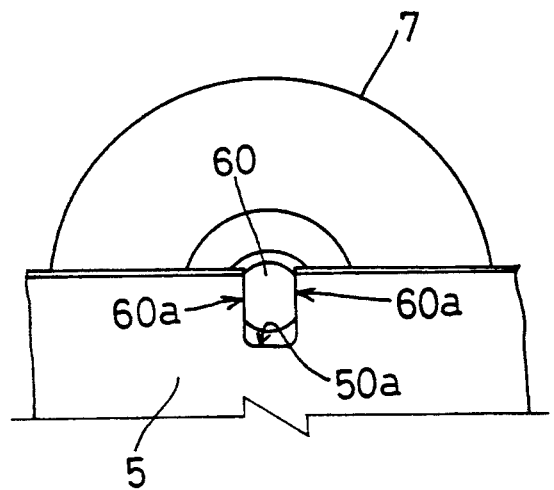
FIG. 8 is an enlarged partial view showing a connection between an axis of a taper cone and a carrier.

As shown in FIG. 7, each taper cone 7 in this embodiment has a support axis 60 extending centrally through the taper cone 7. The axis 60 defines flat surfaces 60a at each ofthe opposite ends thereof. The flat surfaces 60a at one end are fitted in a retainer groove 50a defined in the carrier 5 while the flat surfaces 60a at the other end are fitted in a retainer groove 50a defined in a bracket 50, thereby providing large sliding surfaces to be displaceable within the grooves 50a. FIG.8 shows the relationship between the flat surfaces 60a and the retainer groove 50a of the carrier 5 only, the relationship with the groove 50a of the bracket 50 being similar.

Further, as shown in FIG. 7, each taper cone 7 defines a lubricating oil retaining space 62 opening in a longitudinal direction of the axis 60. An oil passage 63 extends from this space 62 to a gap between the axis 60 and taper cone 7 where a needle bearing 61 is provided.

This stepless transmission is used with such a psoture of the case 1 that the main shaft 3 extends horizontally as shown in fIG. 7. The case 1 contains lubricating oil to a level below the main shaft 3. When the transmission is operating to transmit power, the rotation of the carrier produces a centrifugal force which feeds the lubricating oil from the space 62 through the oil passage 63 to the bearing 61 around the axis 60.

Compared with the case where lubricating oil fills the case 1, this arrangement has the advantage of a reduced resistance applied by the carrier 5 and the like, while the lubricating oil is supplied from the space 62 to the axis 60 of the taper cone 7 moved above the oil surface. Besides, the lubricating oil supplied flows under very little resistance.

Thus, the improved taper cone structure assures a smooth supply of the lubricating oil to the axes 60 of the taper cones 7 although the latter are rotatable with the carrier 5. This stepless transmission facilitates cooling as well as smooth rotation of the taper cones 7.

Fourth Embodiment

Figure 10:
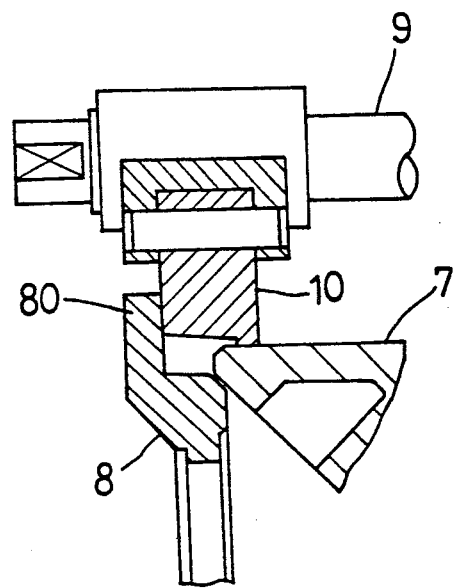
FIG. 10 is a sectional view showing the way in which a change speed member and a rotatable member contact each other.
Figure 9:
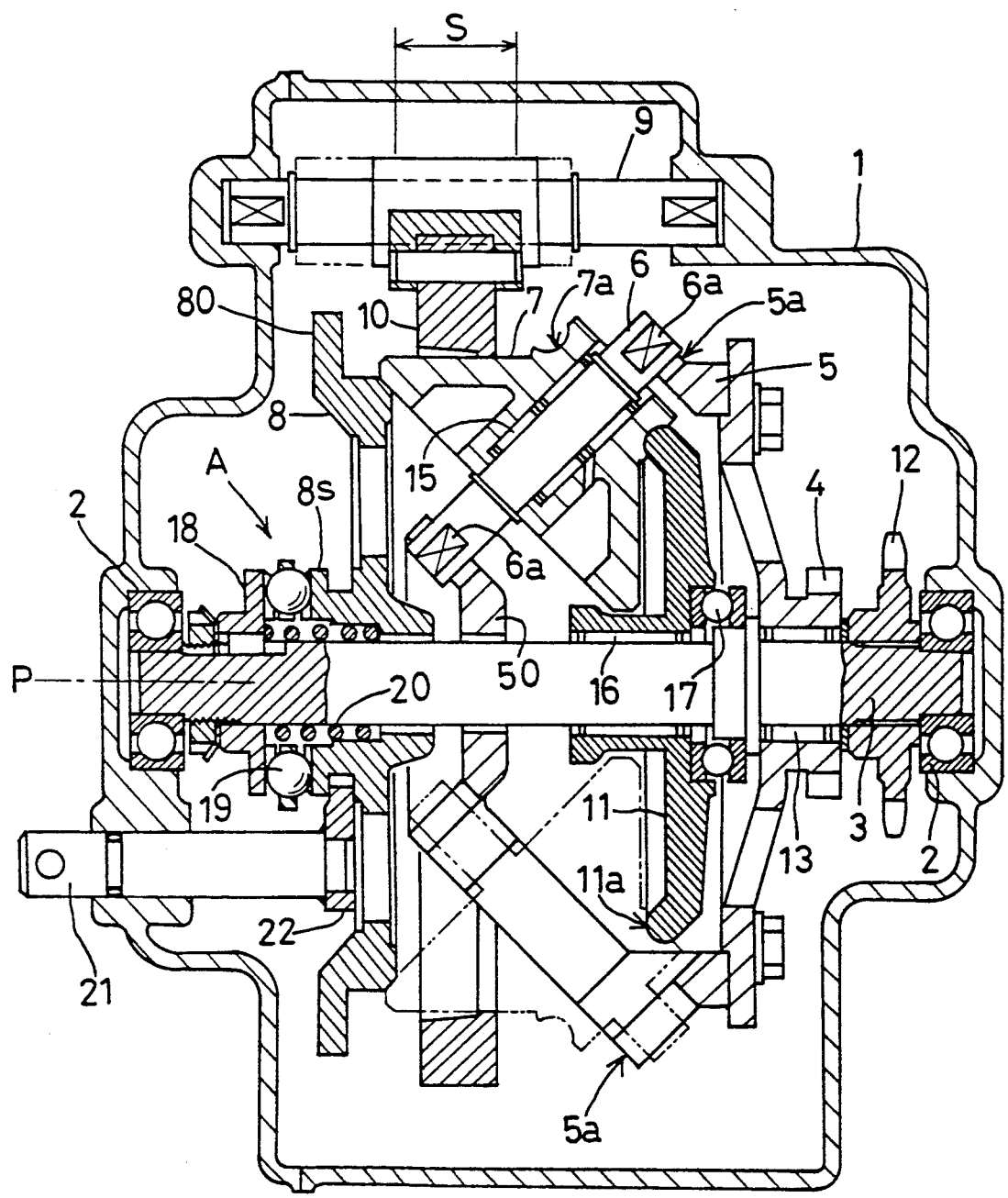
FIG. 9 is a sectional view of a stepless transmission in a fourth embodiment of the present invention.

As seen from FIG. 9, this embodiment has a distinct feture, which is absent from the preceding embodiments, in aperipheral region of the rotatable member 8. The rotatable member 8 includes a contact piece 80 to which the change speed member 10 applies a pressure when the latter is in a lowest speed position. When the change speed member 10 is operated in a decelerating direction nearly to a position for stopping the torque output as shown in FIG. 10, the pressure applied to the contact piece 80 separates the taper cones 7 and rotatable member 8. As a result, the power transmission to the rotatable member 8 is broken, and a braking force applied from the rotatable member 8 to be change speed member 10 positively stops rotation of the sprocket 12.

In the conventional stepless transmission in which the carrier supports the taper cones, the change speed member has a "point" setting position for stopping the output system. The change speed member must be adjusted to the "point" position in order to stop the output.

On the other hand, this embodiment is capable of acceleration, deceleration and braking within a continuous operating range of the change speed member 10. In addition, the change speed member 10 which never rotates, is movable into contact with the rotatable member 8. Consequently, the rotatable member 8 is braked simultaneously with breaking of power transmisison thereto.

This stepless transmission has a relatively simple construction for reliably stopping rotation of the output system by operating the change speed member 10.

Fifth Embodiment

Figure 11:
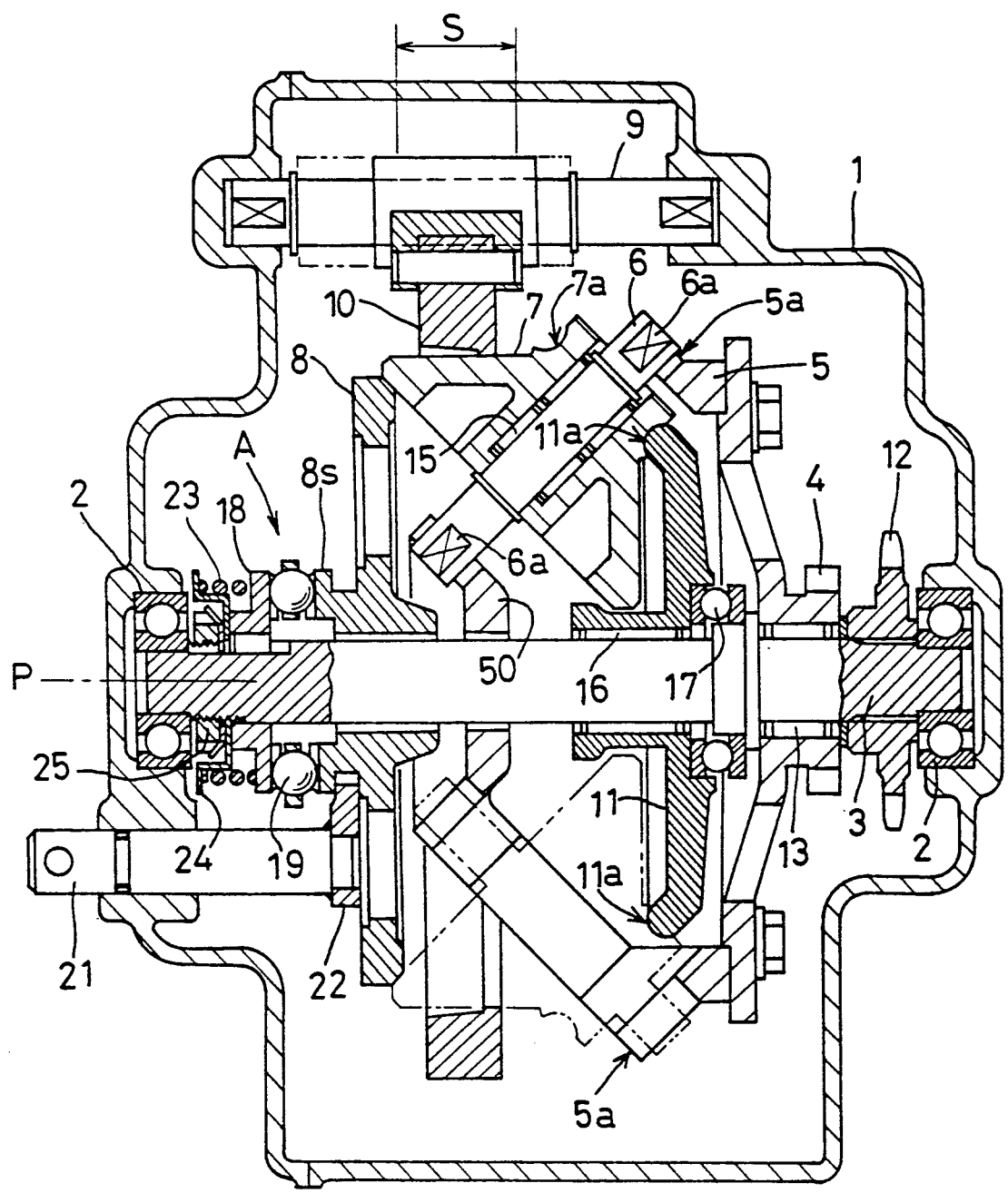
FIG. 11 is a sectional view of a stepless transmission in a fifth embodiment of the present invention.

As shown in FIG. 11, this embodiment differs from the preceding embodiments in that the pressure governor A has a coil spring 23 extending between a side face of the transmission member 18 remote from the rotatable member 8 and a spring stopper disposed between a nut and washer 25 for adjusting position of the transmission member 18.

According to this construction, the coil spring 23 applies an urging force to the rotatable member 8 through the transmission member 18 and balls 19. This enables the rotatable member 8 and transmission member 18 to rotate together also when the transmission at rest is actuated.

That is, in this construction, the taper cones 7 and rotatable member 8 are maintained in contact under a suitable pressure for effecting power transmission regardless of the load. Further, compared with the preceding embodiments in which the compression spring is mounted between the transmission member 18 and rotatable member 8, for example, this embodiment is capable of automatic pressure adjustment in relation to light loads immediately after a start since the balls 19 and cam surfaces 8a and 18a are in contact at the starting time.

Thus, the power transmission between the taper cones and rotatable member is effected with a very simple construction. The taper cones and rotatable member are placed in contact under a suitable pressure for reliable power transmission even immediately after a start or at times of light loads.

The five embodiments described herein may be modified in various ways within the scope of the present invention. For example, the rotatable member may be disposed upstream with respect to the power transmitting flow to take power from the carrier. The taper cones may be freely rotatably supported on the support axes. The described steples transmissions may be used in various fields, including application to self-propelled vehicles, such as by being incorporated into propelling systems of agricultural working vehicles, or to machine tools.

What is claimed is:

1. A ring cone type stepless transmission for effecting change speed on a torque received from an input section and transmitting the torque to an output section comprising:

a carrier rotatable on an axis;

taper cones freely rotatably supported by said carrier wherein each of said taper cones is freely rotatably supported at one end thereof by said carrier through a bearing mounted in a holder displaceable relative to said carrier;

a rotatable member for contacting said taper cones to effect torque transmission therewith;

change speed means movable parallel to said axis to contact varied positions of said taper cones, thereby varying a transmission ratio between said carrier and said rotatable member; and support means for contacting and supporting said taper cones, said support means being arranged to couteract a moment acting on said taper cones as a result of contact pressures applied to said taper cones from said rotatable member and said change speed means.

2. A transmission as claimed in claim 1, further comprising a bearing mounted in a further holder displaceable in the same direction as said holder relative to a rotatable support member rotatable in synchronism with said carrier, each of said taper cones being freely rotatably supported at the other end thereof by said further bearing.

3. A transmission as claimed in claim 2, further comprising an engaging element provided on said rotatable member for contacting part of said change speed means when said change speed means is in a lowest speed region, and separating said rotatable member from said taper cones with a further sliding movement of said change speed means, thereby to break frictional torque transmission from said taper cones to said rotatable member.

4. A ring cone type stepless transmission for effecting change speed on a torque received from an input section and transmitting the torque to an input section, comprising:
a carrier rotatable on an axis;
taper cones freely rotatably supported by said carrier;
a rotatable member for contacting said taper cones to effect torque transmission therewith;
change speed means movable parallel to said axis to contact varied position of said taper cones, thereby varying a transmission ratio between said carrier and said rotatable member;
support means for contacting and supporting said taper cones, said support means being arranged to counteract a moment acting on said taper cones as a result of contact pressures applied to said taper cones from said rotatable member and said change speed means;
input means connected to said carrier; and
output means connected to said rotatable member, said output means formed as an output shaft, and said support means and said carrier rotatably supported on said output shaft.

5. A ring cone type stepless transmission as claimed in claim 4, further comprising:
automatic pressure governor means for pressing said rotatable member against said taper cones with a contact pressure which increases in proportion to the torque transmitted, wherein said automatic pressure governor means includes:
a transmission member axially adjustably mounted for torque transmission on a transmission shaft acting as one of said output means and said input means;
a first cam surface defined as a wedge-like recess on said transmission member;
a second cam surface defined as a wedge-like recess on said rotatable member and opposed to said first cam surface;
balls sandwiched between said first and second cam surfaces; and
a coil spring for applying an initial contact pressure to said rotatable member, said automatic pressure governor means arranged to break frictional power transmission between said rotatable member and said taper cones when said balls engage the deepest regions of said first and second cam surfaces and said rotatable member is at an extreme position toward said transmission member,
wherein said coil spring is in contact with a side face of said transmission member remote from said rotatable member for pressing said rotatable member through said first cam surface, said balls and said second cam surface.

6. A transmission as claimed in claim 4, wherein said carrier includes support axes for supporting said taper cones, said taper cones being freely rotatably supported by said support axes through bearings, respectively, and each of said taper cones defines an oil sump and an oil passage connecting said oil sump to each of said bearings.

7. A ring cone type stepless transmission for effecting change speed on a torque received from an input section and transmitting the torque to an output section, comprising:
a carrier rotatable on an axis;
taper cones freely rotatably supported by said carrier;
a rotatable member for contacting said taper cones to effect torque transmission therewith;
change speed means movable parallel to said axis to contact varied positions of said taper cones, thereby varying a transmission ratio between said carrier and said rotatable member;
support means for contacting and supporting said taper cones, said support means being arranged to counteract a moment acting on said taper cones as a result of contact pressures applied to said taper cones from said rotatable member and said change speed means;
input means connected to said carrier;
output means connected to said rotatable member, said output means formed as an output shaft, and said support means and said carrier rotatably supported on said output shaft; and
an engaging element provided on said rotatable member for contacting part of said change speed means when said change speed means is in a lowest speed region, and separating said rotatable member from said taper cones with a further sliding movement of said change speed means, thereby to break frictional torque transmission from said taper cones to said rotatable member.

8. a ring cone type stepless transmission for effecting change speed on a torque received from an input section and transmissing the torque to an output section, comprising:
a carrier rotatable on an axis;
taper cones freely rotatably supported by said carrier;
a rotatable member for contacting said taper cones to effect torque transmission therewith;
change speed means movable parallel to said axis to contact varied positions of said taper cones, thereby varying a transmission ratio between said carier and said rotatable member;
support means for contacting and supporting said taper cones, said support means being arranged to counteract a moment acting on said taper cones as a result of contact pressures applied to said taper cones from said rotatable member and said change speed means;
input means connected to said carrier;
output means connected to said rotatable member, said outpout means formed as an output shaft, and said support means and said carrier rotatably supported on said output shaft; and
automatic pressure governor means for pressing said rotatable member against taper cones with a contact pressure which increases in proportion to the torque transmitted, said automatic pressure governor means including:

a transmission member axially adjustably mounted for torque transmission on a transmission shaft acting as one of output means and input means;

a first cam surface defined as a wedge-like recess on said transmission member;

a second cam surface defined as a wedge-like recess on said rotatable member and opposed to said first cam surface;

balls sandwich between said first and second cam surfaces; and a coil spring for applying an initial contact pressure to said rotatable member, said coil spring being in contact with a side face of said transmission member remote from said rotatable member for pressing said rotatable member through said first cam surface, said balls and said second cam surface.

9. A ring cone type stepless transmission for effecting change speed on a torque received from an input section and transmitting the torque to an output section, comprising:

a carrier rotatable on an axis;

support axes provided on said carrier;

taper cones freely rotatably supported by said support axes of said carrier through bearings, respectively, each of said taper cones defining an oil sump and an oil passage connecting said oil sump to each said bearings;

a rotatable member for contacting said taper cones to effect torque transmission therewith;

change speed means movable parallel to said axis to contact varied positions of said taper cones, thereby varying a transmission ratio between said carrier and said rotatable member;

support means for contacting and supporting said taper cones, said support means being arranged to counteract a moment acting on said taper cones as a result of contact pressures applied to said taper cones from said rotatable member and said change speed means;

input means connected to said carrier; and output means connected to said rotatable member, said output means formed as an output shaft, and said support means and said carrier rotatably supported on said output shaft.

10. A ring cone type stepless transmission for effecting change speed and output on a torque received from a prime mover, said stepless transmission comprising:

an input section for receiving the torque;

a carrier operatively connected to said input section and having an axis about which the carrier is rotatable;

taper cones supported by said carrier and revolving around said axis, said taper cones being freely rotatably mounted on said carrier at an apex region thereof;

a rotatable member for contacting a bottom region of said taper cones to effect torque transmission therewith;

an output section operatively connected to said rotatable member for outputting the changed torque;

change speed means movable parallel to said axis to contact varied inclined positions of said taper cones, thereby varying a transmission ratio between said input section and said output section; and support means for contacting and supporting said taper cones, said support means being arranged to counteract a moment acting on said taper cones as a result of contact pressures applied to said taper cones from said rotatable member and said change speed means.

11. A ring cone type stepless transmission as claimed in claim 10 wherein said input section, carrier, rotatable member and support means are coaxially mounted with one another.

* * * * *

UNITED STATES PATENT AND TRADEMARK OFFICE
CERTIFICATE OF CORRECTION

PATENT NO. : 5,129,869

DATED : July 14, 1992

INVENTOR(S) : Makoto Sagata, Kiyoshi Nabetani and Tokudo Saita

It is certified that error appears in the above-identified patent and that said Letters Patent is hereby corrected as shown below:

Column 1 Line 12 after "supporting" insert --the taper cones and connected to an input--.

Column 1 Lines 13-14 after "change" delete --connected to an input shaft, a ring-shaped change--.

Column 1 Lines 54-55 "rotatably" should read --rotatable--.

Column 2 Line 61 "transmisssion" should read --transmission--.

Column 2 Line 66 begin new paragraph with "FIG. 9".

Column 4 Line 8 after "provide" insert --large--.

Column 4 Line 61 "hereinbofore" should read --hereinbefore--.

Column 5 Line 6 "ofthe" should read --of the--.

Column 5 Line 11 "FIG.8" should read --FIG. 8--.

UNITED STATES PATENT AND TRADEMARK OFFICE
CERTIFICATE OF CORRECTION

PATENT NO. : 5,129,869

DATED : July 14, 1992

INVENTOR(S) : Makoto Sagata, Kiyoshi Nabetani and Tokudo Saita

It is certified that error appears in the above-identified patent and that said Letters Patent is hereby corrected as shown below:

Column 5 Line 20 "psoture" should read --posture--.

Column 5 Line 22 "fIG." should read --FIG.--.

Column 5 Line 43 "feture" should read --feature--.

Column 5 Line 44 "aperipheral" should read --a peripheral--.

Column 5 Line 54 "to be" should read --to the--.

Column 6 Line 41 "steples" should read --stepless--.

Claim 4 Line 19 Column 7 "input" should read --output--.

Claim 8 Line 41 Column 8 "a" should read --A--.

Claim 8 Line 43 Column 8 "transmissing" should read --transmitting--.

Claim 8 Line 52 Column 8 "carier" should read --carrier--.

UNITED STATES PATENT AND TRADEMARK OFFICE
CERTIFICATE OF CORRECTION

PATENT NO. : 5,129,869

DATED : July 14, 1992

INVENTOR(S) : Makoto Sagata, Kiyoshi Nabetani and Tokudo Saita

It is certified that error appears in the above-identified patent and that said Letters Patent is hereby corrected as shown below:

Claim 8 Line 61 Column 8 "outpout" should read --output--

Claim 8 Line 65 Column 8 after "against" insert --said--.

Claim 8 Line 9 Column 9 "sandwich" should read --sandwiched--.

Signed and Sealed this

Twenty-eighth Day of September, 1993

Attest:

BRUCE LEHMAN

Attesting Officer

Commissioner of Patents and Trademarks